United States Patent [19]

Papay

[11] 4,258,391
[45] Mar. 24, 1981

[54] SOUND INTERCARRIER DETECTOR

[75] Inventor: Joseph M. Papay, Kitchener, Canada

[73] Assignee: Pay Television Corporation, Manhasset, N.Y.

[21] Appl. No.: 62,527

[22] Filed: Jul. 31, 1979

[51] Int. Cl.³ .............................................. H04N 5/62
[52] U.S. Cl. .................................................. 358/197
[58] Field of Search ......................................... 358/197

[56] References Cited

FOREIGN PATENT DOCUMENTS 2812895 10/1978 Fed. Rep. of Germany ........... 358/197

*Primary Examiner*—Richard Murray

*Attorney, Agent, or Firm*—J. Gibson Semmes

[57] ABSTRACT

In television reception, the sound intercarrier signal is detected by mixing the composite sound intermediate frequency signal, which is taken from an output of the video IF amplifier, with a clean, unmodulated signal, which is extracted from the oscillator output of the video synchronous detector and, accordingly, phase locked to the composite video intermediate frequency signal. Complementary amplifier stages, having highly selective tuned matching networks and traps, provide necessary gain and further purification of the respective signals before input to the intercarrier coincidence detector.

3 Claims, 2 Drawing Figures

SOUND INTERCARRIER DETECTOR

BACKGROUND OF THE INVENTION

This invention broadly relates to television reception and, more particularly, to a novel method and circuit for distortion-free detection of the intercarrier sound signal by mixing the sound intermediate frequency signal with a pure unmodulated signal which is derived from the oscillator output of the video synchronous detector and, accordingly, phase-locked to the video intermediate frequency signal. While the invention is generally useful in all intercarrier television receivers, it has particular utility in subscription television receivers where distortion or loss of the sound signal cannot be tolerated because of audio encoding techniques involving modulation of non-standard frequencies as well as juxtaposition of sound frequencies within the broadcast band.

In known monochromatic receivers, the respective sound and video intermediate frequency signals are amplified in the video intermediate frequency amplifier and then heterodyned in the video detector or in the intercarrier sound detector to produce the intercarrier sound signal. In known color receivers, the sound intermediate frequency carrier must be severely attenuated in the video intermediate frequency amplifier to prevent the interference pattern which would be caused if the sound intermediate frequency carrier and color subcarrier were allowed to beat together in the video detector. Accordingly, in such receivers, sound and video intermediate frequency signals are obtained from a point preceding the video detector and supplied to a separate sound detector for producing the intercarrier signal. The output of the video intermediate frequency amplifier is usually selected as the take-off point for the intermediate frequency signals.

Although differing in point of signal take-off and means of detection, recovery of the sound intercarrier in both of the above known receivers is effected by mixing the respective video and sound intermediate frequency signals. Since this mixing is governed by a multiplication process between the respective amplitude and frequency components of the wave forms representing the video and sound intermediate frequency carriers, production of the intercarrier sound signal, and, hence, recovery of the transmitted sound information, is dependent upon the video content, i.e. amplitude, of the video carrier. Thus, receivers employing this intercarrier detection technique suffer from the disadvantage that distortion of the video carrier results, as well, in unavoidable distortion of the recovered sound. Such distortion is typically occasioned by overmodulation of the video carrier beyond the prescribed maximum modulation depth, as for example, when a local affiliate superimposes call letters or messages over a network broadcast. Even in the absence of overmodulation, other signal degradations affecting the video carrier, such as noise, and preshoots and overshoots generated by envelope delayed distortion, can likewise produce sound distortion in receivers using known intercarrier recovery techniques.

SUMMARY OF THE INVENTION

The present invention is primarily directed towards a method and circuit for detecting in T.V. reception the intercarrier sound signal which eliminates the audio-distortional effects resulting from distortion of the picture carrier. In general terms, this distortional immunization is achieved by techniques which include mixing the composite sound intermediate frequency signal with a clean, unmodulated carrier extracted from the oscillator output of the video synchronous detector. Accurate detection of the intercarrier sound signal is assured since the oscillator generates a clean carrier which is phase-locked to the original, composite video intermediate frequency carrier. In the present preferred embodiment of this invention, the synchronous detector oscillator output signal is supplied to a first amplifier that is loaded with a matching network which tunes the amplifier to the video intermediate frequency. Before detection, the resultant amplified, band-passed output of this first amplifier is further purified by a trap tuned to the sound intermediate frequency. This purified signal is mixed in the intercarrier coincidence detector with a frequency modulated sound intermediate frequency signal, which is obtained from an output of the video intermediate frequency amplifier. Before mixing, this sound signal is processed, in similar fashion to the clean video IF carrier, by a complementary amplifier stage tuned to the sound intermediate frequency and followed by a trap tuned to the video intermediate frequency.

BRIEF DESCRIPTION OF THE DRAWINGS

Other objectives and advantages of the invention will become apparent to those skilled in the art from the following description taken in conjunction with the accompanying drawings, wherein.

DESCRIPTION OF THE PREFERRED EMBODIMENT

Figure 2:
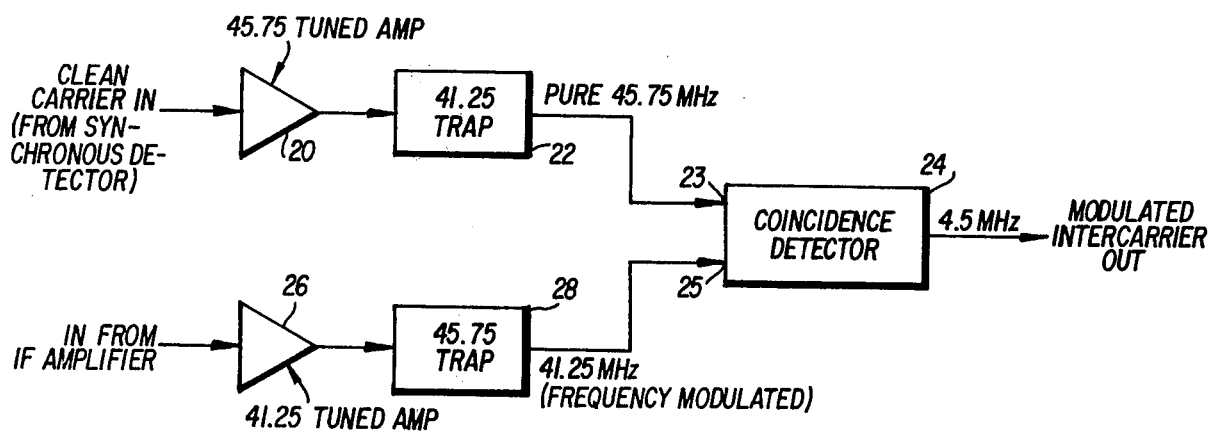
FIG. 2 is a simplified block diagram of a circuit according to the present invention.

FIG. 2 is a simplified block diagram showing a sound intercarrier detector according to the present invention as interconnected with elements of a conventional television receiver. For illustrational purposes only, the almost universally employed intermediate frequencies, 45.75 MHz for the video intermediate frequency and 41.25 MHz for the sound intermediate frequency, are used herein and on the drawings for descriptive clarity. Obviously, other combinations of frequencies differing by the established 4.5 MHz could be used with equal success herein.

As well, it will be readily apparent to one skilled in the art that the inventive techniques disclosed herein are not limited in application solely to television receivers or to television frequencies. Obviously, the techniques could be used with subscription television systems or any receiver system which employs mixing and demodulation of information carrying signals. In addition, it may be that other systems or methods exist or may be discovered that would make it desirable to generate the phase locked clean carrier and perform the mixing at high frequency levels without down conversion to intermediate frequencies.

As shown in FIG. 2, and explained more fully hereinafter with respect to FIG. 1, an unmodulated, clean carrier is extracted from the oscillator section of the video synchronous detector and applied to the input of a first amplifier 20 which is sharply tuned to the video intermediate frequency, here 45.75 MHz. The amplified output of the first amplifier 20 is applied to the sound IF trap 22 and, thereafter, for mixing, to a first input 23 of the sound intercarrier coincidence detector 24. Functionally, the sound IF trap prevents undesired signals at the sound intermediate frequency (41.25 MHz) from being passed on to the coincidence detector 24, thus assuring that only the completely pure unmodulated clean carrier will be mixed with the sound intermediate frequency signal to produce the modulated intercarrier sound signal. Accordingly, sound IF trap 22 is additional precaution to guard against possible: e.g. parasitic, coupling of signals at the sound intermediate frequency.

It is to be noted that, for high performance, it is necessary to utilize an optimally clean carrier which is precisely in phase with the composite signal. Such a carrier is available from any synchronous detector which has a phase locked loop oscillator. Accordingly, reference herein to a synchronous detector is intended to encompass a synchronous detector having a phase lock loop which includes an oscillator. As well, as used herein the term clean carrier is meant to refer to a signal taken from the output of the oscillator section of such a synchronous detector. It is also to be understood that, since the carrier produced by filtering techniques in detectors which utilize product demodulation will not yield satisfactory results with this invention, such devices are excluded from the definition herein of synchronous detector.

As previously mentioned, the intercarrier sound signal is produced by mixing the clean unmodulated 45.75 MHz carrier with a sound IF signal which is frequency modulated with the transmitted audio information. As shown in FIG. 2, this sound IF signal is obtained from the conventional video IF amplifier, not shown, and applied to a second amplifier 26 which is tuned to the sound intermediate frequency (41.25 MHz.) The amplified, band-passed output of the second amplifier 26 is fed through video IF trap 28 to the second input 25 of the coincidence detector 24. It will be noted that this lower segment, 26 and 28, of the circuit is functionally complementary to the previously described upper segment, 20 and 22, which selectively amplifies and purifies the clean video IF signal. The lower segment, however, is tuned to the sound intermediate frequency (41.25 MHz) and provided with a trap 28 to eliminate any spuriously coupled signals at the video intermediate frequency (45.75 MHz.)

It should be further noted that various points can be selected for taking off the sound intermediate frequency signal. While the precise take-off point is not critical to this invention, it is desirable to extract this signal from an output of one of the video IF amplifier stages to take advantage of the available gain. It is also preferred to select a point which follows the traps which are usually included in such conventional amplifiers, e.g. following the traps for the respective adjacent channel sound and video carriers.

To one skilled in the art, it will be apparent that various other detectors, such as those employing diodes or transistors, could be utilized in place of the coincidence detector described herein. The use of such other detectors, however, is not desirable since they produce unwanted intermodulation and assymetrical output. Instead, a coincidence detector is preferred because the output is not only symetrical but also cleaner as a result of the greater degree of selectivity afforded the video intermediate frequency.

Because of its immunity to video distortion, the invention is also well adapted to deliver the optimum input levels required for satisfactory operation of a coincidence detector. In contrast, because of noise, spikes, over-modulation, or other forms of distortion, known receiving techniques may be insufficient to deliver the requisite video input level for a coincidence detector, thus producing a non-symetrical intercarrier which yields distortion when demodulated.

Figure 1:
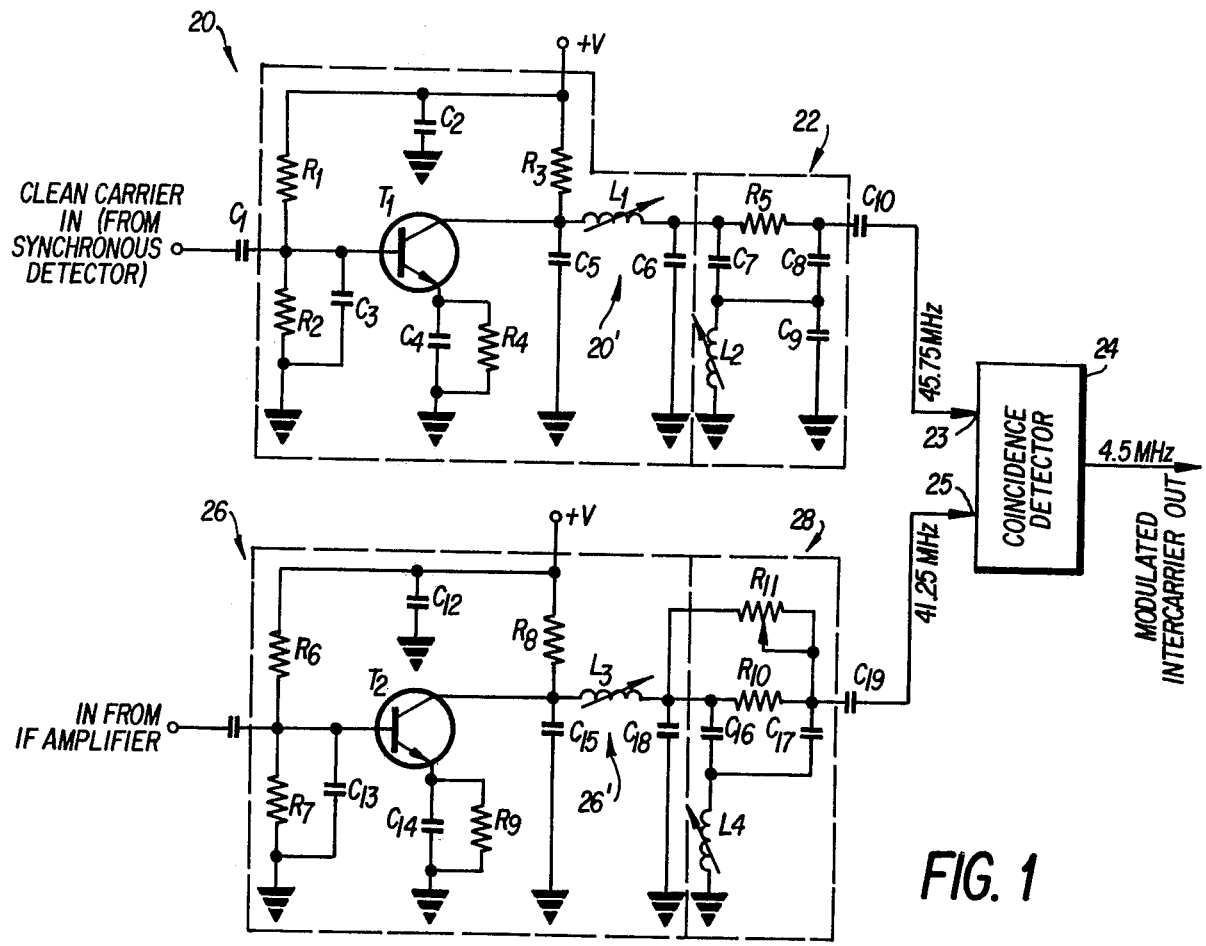
FIG. 1 is an electrical schematic diagram of a preferred embodiment of the sound intercarrier detector circuit.

FIG. 1 is an electrical schematic diagram showing, in greater detail, first and second amplifiers, 20 and 26 respectively, and sound IF and video IF traps, 22 and 28 respectively. As illustrated, a clean, unmodulated video IF carrier is fed via coupling capacitor C1 to the base of transistor T1. As previously noted, this clean carrier is extracted from the oscillator section of the video synchronous detector. For obtaining this signal, the invention is well adapted, but not limited, to use with synchronous detectors of conventional integrated circuit design, such as a CA3136, in which the provided phase-locked loop includes a VCO. When using such a device, the output of the VCO provides a clean, unmodulated carrier which is phase-locked to the composite video IF carrier. While any suitable means of extracting the VCO output may be utilized, it has been found advantageous to employ magnetic coupling to prevent noise generated in the IC unit from being passed into the sound stage. This form of coupling is also quite easily achieved since the tank circuit necessary for the VCO in such devices is usually externally provided.

Transistor T1, as shown in a common emitter configuration, generally comprises the basic component of the first amplifier 20 of FIG. 2. Connected as shown between the positive power supply and ground, resistors R1 and R2 provide appropriate bias for the base of transistor T2. Capacitor C2 is a decoupling capacitor for the power supply while capacitor C3 functions as a RF decoupling capacitor, thus providing stability to the circuit. In conventional manner, load resistor R3 is provided in the collector circuit of transistor T2, and emitter resistor R4 and by-pass capacitor C4 are provided in the emitter circuit.

The output of transistor T1 is fed into a first tuned matching network 20' comprising capacitors C5 and C6 and inductor L1. This network performs a dual function. First, it transforms the output impedance of transistor T1 to match the input impedance of the coincidence detector 24. If, by way of example only, a coincidence detector such as a TDA 2840 is employed, then this network would function to lower the characteristically high output impedance of transistor T1 to match the input impedance of this detector. In conjunction with the internal capacitance of transistor T1, this matching network also functions as a single-tuned band-pass circuit which sharply tunes transistor T1 to pass the video intermediate frequency: i.e. 45.75 MHz, while discriminating strongly against the related sound intermediate frequency: i.e. 41.25 MHz. The output of this first tuned matching network 20' is applied to the sound IF trap 22 which comprises resistor R5, inductor L2, and capacitors C7, C8, and C9. These elements coact to remove any parasitically coupled signals at the sound intermediate frequency, thus further purifying the signal so that only the clean carrier is provided at the first input 23 of the coincidence detector 24 via coupling capacitor C10.

Transistor T2 is utilized, similarly to transistor T1, in a common emitter configuration as the principal amplifier component generally corresponding to second amplifier 26 of FIG. 2. It will be noted that the biasing and compensating arrangements for transistor T2 are identical to those previously discussed with respect to transistor T1. Thus, resistors R6 and R7 provide bias for the base of transistor T2 while capacitor C12 and C13 serve as decoupling capacitors. Similarly, emitter resistor R9, by-pass capacitor C14, and load resistor R8 are provided.

In a manner analogous to that for transistor T1, a second tuned matching network 26' is connected to the output of transistor T2. This network, comprising capacitor C15 and C18, and inductor L3, also performs a dual function like that of the first tuned matching network, i.e. impedance transformation and band-pass tuning of transistor T2. It will be noted, nonetheless, that the respective values of C15, C18, and L3 are selected so that this amplifier stage is sharply tuned to pass the sound intermediate frequency (41.25 MHz) while strongly discriminating against signals at the video intermediate frequency, (45.75 MHz.) This second tuned matching network is followed by the video IF trap 28, comprising inductor L4, capacitors C16 and C17, resistor R10 and trimmer resistor R11. As discussed above, this trap is tuned to the video intermediate frequency to eliminate any spurious signals at this frequency which might be present because of parasitic coupling.

The remaining elements associated with this lower segment of the circuit, i.e. capacitors C11 and C19, function, respectively, to couple the input and output thereof.

It should be noted that the necessity for including the various amplifiers, tuned matching network, and traps, depends upon the available inputs for the coincidence detector. Thus, for example, if used in a system in which a clean sound IF carrier is available, separate from other composite signals, e.g. video IF, then such signal could be directly coupled to the coincidence detector. If such a signal were available only at a low level, then the amplifier could be included for gain. If, as in the herein preferred application to a television receiver, the modulated sound IF signal is included with the entire video IF spectrum, then it is necessary to filter out the sound IF carrier and trap the video IF carrier before the signal enters the coincidence detector.

The combination of tuned circuits and traps selected here are designed to economically achieve a very sharp selectivity. It will be apparent that other techniques and devices, such as low and high pass filters, could be employed to achieve equivalent results.

Although the invention has been described in its preferred form, it will be apparent to those skilled in the art that various changes and modifications in addition to those discussed above may be made without deviating from the inventive concepts set forth above. Accordingly, it is to be understood that the appended claims are intended to cover all such modifications as fall within the scope and spirit of the invention.

I claim:

1. In combination with a television receiver having sound and video intermediate frequency signals, a video intermediate frequency amplifier, and a video synchronous detector, a circuit comprising:
   (A) an intercarrier sound detector, having first and second inputs;
   (B) a first amplifier having output and input, said input being coupled to the oscillator output of the video synchronous detector;
   (C) a second amplifier having output and input, said input being coupled to an output of the video intermediate frequency amplifier;
   (D) a first output circuit, coupling the output of said first amplifier to the first input of the intercarrier sound detector, said first output circuit including
   ($D_1$) a first impedance matching network for tuning said first amplifier to the video intermediate frequency and
   ($D_2$) a sound intermediate frequency trap interposed between said first impedance matching network and said intercarrier sound detector;
   (E) a second output circuit coupling the output of said second amplifier to the second input of the intercarrier sound detector, including:
   ($E_1$) a second impedance matching network for tuning said second amplifier to the sound intermediate frequency and
   ($E_2$) a video intermediate frequency trap interposed between said second impedance matching network and said intercarrier sound detector.

2. The circuit according to claim 1 wherein said intercarrier sound detector comprises a coincidence detector.

3. For use with a receiver having video and sound intermediate frequency signals, and a video synchronous detector, a method of detecting the intercarrier sound signal, comprising the steps of:
   (A) obtaining an output signal from the oscillator of the video synchronous detector and concurrently therewith obtaining a sound intermediate frequency signal;
   (B) selectively amplifyng the respective signals obtained in step (A) while selectively filtering the amplified signals to eliminate undesired signals therefrom;
   (C) mixing the signals obtained in steps (A) and (B) in an intercarrier sound detector.

* * * * *